Oct. 3, 1944.　　　R. A. HARTMAN　　　2,359,418
FASTENING DEVICE
Filed Aug. 14, 1943　　　2 Sheets-Sheet 1

INVENTOR.
RICHARD A. HARTMAN
BY Bates, Teare & McClean
ATTORNEYS

Oct. 3, 1944.                    R. A. HARTMAN                    2,359,418
                                 FASTENING DEVICE
                        Filed Aug. 14, 1943            2 Sheets-Sheet 2
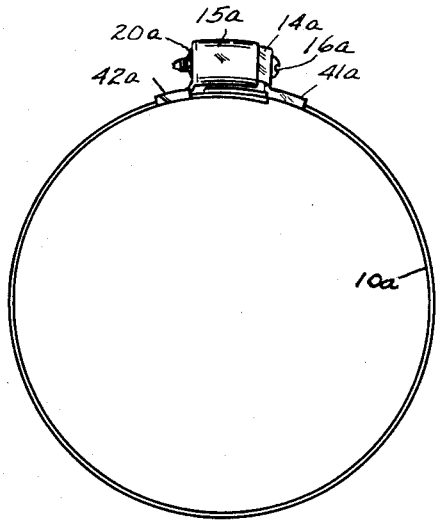
Fig.7
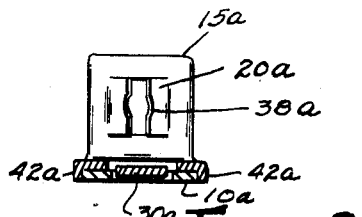
Fig. 9
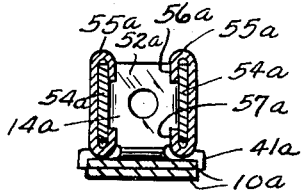
Fig.10
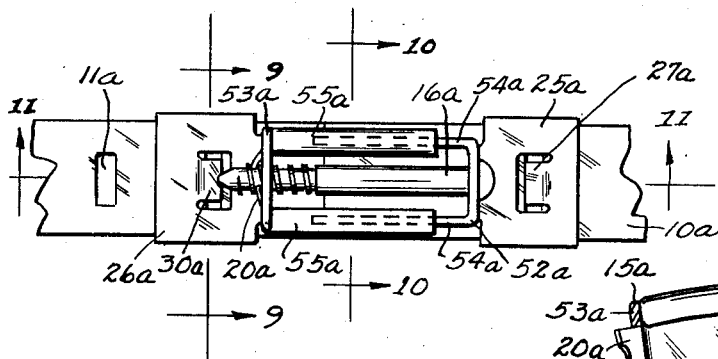
Fig.8
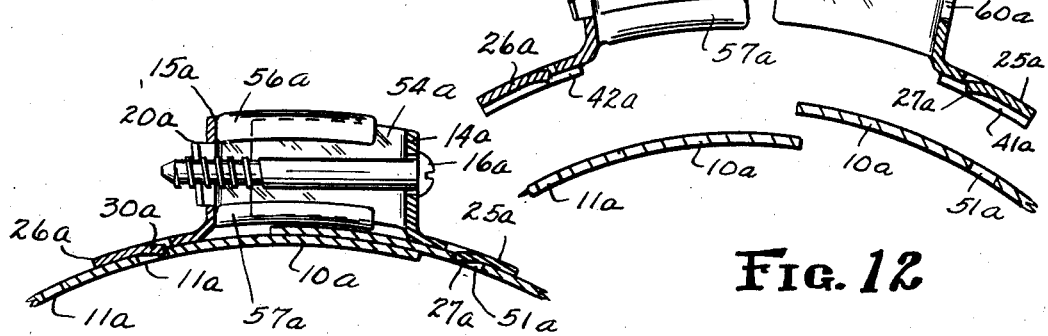
Fig.12
Fig.11
INVENTOR.
RICHARD A. HARTMAN
BY Bates, Teare, & McKean
ATTORNEYS Patented Oct. 3, 1944

2,359,418

UNITED STATES PATENT OFFICE 2,359,418

FASTENING DEVICE

Richard A. Hartman, Cleveland, Ohio, assignor to Tinnerman Products, Inc., Cleveland, Ohio, a corporation of Ohio Application August 14, 1943, Serial No. 498,688

9 Claims. (Cl. 24—19)

This invention relates to hose clamps, and has for one of its objects the provision of a clamp that may obtain a very tight grip on the rubber conduit without injuring it and which will compress it against the wall of an embraced tube so that the joint will withstand high internal pressure without leakage. A further object is to make a band wherein a threaded member may be utilized for tightening the band, and wherein all of the parts may be made of stampings and yet will possess sufficient rigidity to withstand a high degree of compression without bending or twisting during the tightening operation.

I carry out the above object by providing a band of resilient sheet material in the form of a loop, the ends of which are adapted to overlap. Coacting lugs are then detachably mounted on the ends of the strip and are telescopically made so as to support each other during the tightening operation, and thereby to impart great rigidity to the assembled structure.

Figure 1:
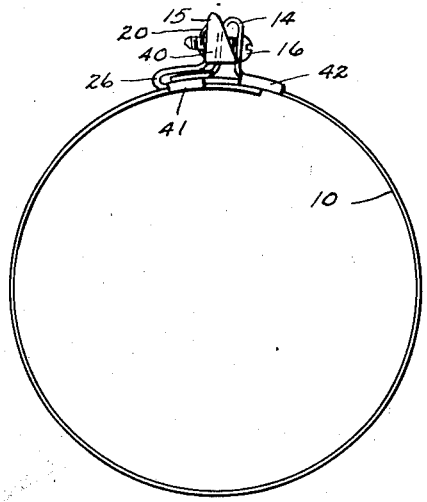
Figure 2:
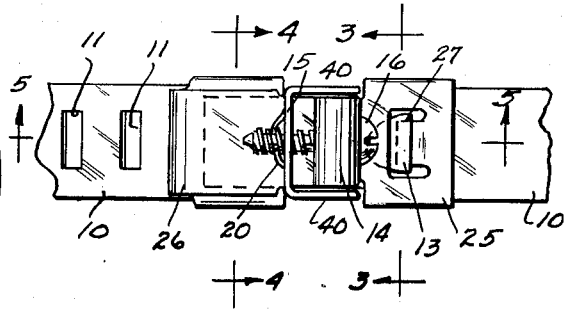
Figure 5:
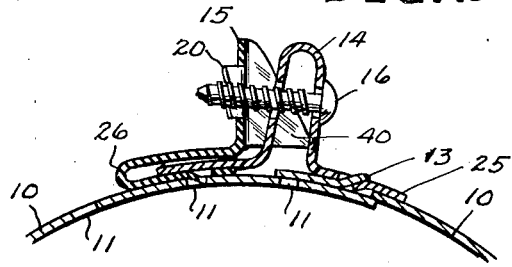
Figure 3:
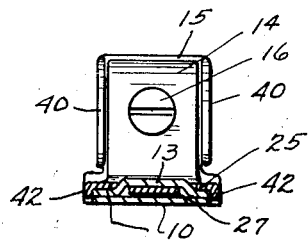
Figure 4:
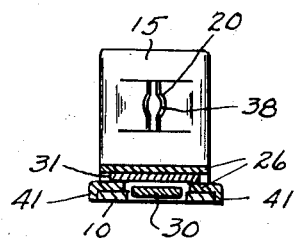
Figure 6:
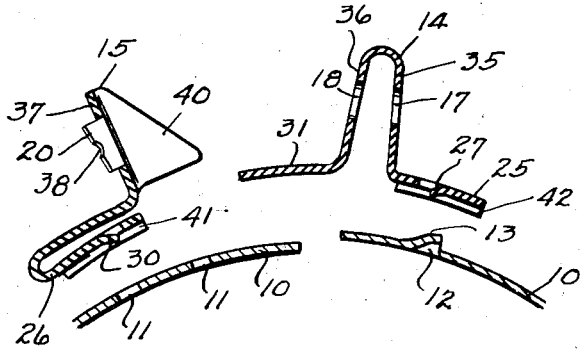

In the drawings, Fig. 1 is a side view of a hose clamp embodying one form of my invention; Fig. 2 is a top plan view of the clamp on a scale larger than that shown in Fig. 1; Figs. 3, 4, and 5, are sections taken on the correspondingly numbered lines in Fig. 2; Fig. 6 is an exploded sectional view showing the relationship of the parts that coact to form the unit; Fig. 7 is a side view of a band illustrating a modified construction; Fig. 8 is a top plan view of the band shown in Fig. 7, but on a larger scale; Figs. 9, 10, and 11, are sections taken on the correspondingly numbered lines in Fig. 8, and Fig. 12 is an exploded sectional view illustrating the relationship of the parts which coact to form the completed unit of Fig. 7.

Referring now to Fig. 1, 10 designated the body of the band which is a parallel-sided strip of resilient sheet material preferably spring steel. One end of the band is shown as having one or more parallel sided slots, designated 11, while the other end has an opening 12. Preferably the opening 12, as shown in Fig. 6, is made by striking up a tongue 13 from the strip, leaving an entrance larger than the thickness of the metal of the lug which is adapted to be positioned thereon. The lug 14, as shown in Fig. 5, is adapted to be carried by one end of the band, while the coacting lug 15 is adapted to be positioned on the other end of the band. A fastening member 16 is then arranged to pass through suitable openings 17 and 18 in the lug 14, and to coact with a thread-engaging portion 20 that is carried by the lug 15.

As shown in Fig. 2, each lug has substantially the same width as the strip 10, and each has a portion thereof bearing against the strip and extending longitudinally thereof. The strip-engaging portion on the lug 14 is indicated at 25, and that on the lug 15 is indicated at 26. The portion 25 has a tongue 27 extending downwardly therefrom and adapted to enter the opening 12 and to coact with the portion 13 on the strip to form interengaging shoulders that restrict movement of the extension 25 with relation to the strip in a direction extending toward the end of the strip. On the other hand, such construction enables the lug to be quickly assembled onto the strip merely by inserting the finger 27 into the slot and pushing it toward the end of the strip until a firm interlocking engagement is obtained. It is to be noted that the finger 27 is sufficiently short that it does not project beyond the inner surface of the strip 10, wherefore the ends of the strip may overlap during the clamping operation.

The lug 15 coacts with the end of the strip opposite that engaged by the lug 14 through the medium of a finger 30 which is struck downwardly from the extension 26 and is adapted to enter any one of the slots 11 and to coact with the wall thereof nearest the end of the strip to resist movement of the lug with relation to the strip in a direction toward the end thereof. The finger 30 extends downwardly sufficiently only to engage the shoulder without projecting beyond the inner surface of the band so as to avoid any cutting of the hose during the tightening operation. In the form shown in Fig. 1, the extension embodies an upper and lower arm between which a forward extension 31 on the lug 14 may project telescopically as is shown, for example, in Fig. 5.

Each lug is formed of a single strip of metal, the lug 14 being bent intermediately to provide two upright arms 35 and 36, while the lug 15 has an upwardly extending portion 37 which carries the thread-engaging part 20. In the form illustrated, such part comprises opposed tongues which are struck from the part 37 and which are notched, as at 38, to receive the shank of the fastening member 16.

To guide the lugs in their movement toward each other, and to reinforce them against any twisting that is apt to occur during tightening of the bolt, I have illustrated the lug 15 as having wings 40 that extend parallel to each other at the sides of the lug, and that are adapted to receive the arms 35 and 36 of the lug 14 in the assembled position, as is shown in Figs. 1 and 2. In such position, the fastener receiving openings in the lugs are substantially in registration, as a result of which, the bolt may be readily tightened without distortion of the clamping parts. As a further means of guiding the lugs, the lug 15 has side flanges 41 that are adapted to coact with the sides of the strip 10, and the extension 25 has side flanges 42 that are also adapted to coact with the sides of the strip, as is illustrated in Figs. 3 and 4, respectively. Such side flanges resist twisting and additionally serve to facilitate rapid assembly of the unit.

In practice, the parts illustrated in Figs. 1 to 6 may be assembled merely by superimposing the lugs upon the ends of the strip and forcing the fingers thereon into engagement with the shoulders on the strip, by pushing each lug longitudinally of the strip in a direction toward the nearest end thereof. This assembly may be accomplished without the necessity for welding any of the parts together or by utilizing any extraneous fastening means. Thereupon, the band may be placed about the hose and the ends may be brought into overlapping relationship, the extension 31 on the lug 14 entering the U-shaped part on the extension 26, and then the fastening member may be inserted and tightened to the desired extent.

A modification is illustrated in Figs. 7 to 12 inclusive, wherein parts somewhat similar to those in Figs. 1 to 6 inclusive bear similar reference numerals accompanied by the exponent a. Thus in Figs. 7 to 12 there is shown a band 10a similar to the band 10 as aforesaid, except that the slots 11a on one end of the band may be the same in shape as the slots 51a on the other end of the band. The lug construction is somewhat different from that illustrated in Figs. 1 to 6, but the telescopic principle is utilized for guiding the ends of the band toward each other and for insuring a rigid interfitting connection.

In the modified form, the lugs are designated 14a and 15a, and each has an extension 25a and 26a, which is adapted to bear against the outer surface of the band, and each extension has side flanges 41a and 42a, respectively, for engaging the strip and for coacting therewith to assure rigidity in the assembled structure. Additionally, each lug has an upwardly extending portion 52a and 53a, respectively, and each has wings that telescopically coact to assure further rigidity in the assembly. Thus, the lug 14a has wings 54a, while the lug 15a has wings 55a, projecting toward each other. The wings 55a may have flanges 56a at the top thereof and flanges 57a at the bottom thereof which coact to provide a channel for receiving the wings 54a on the lug 14a. This may be illustrated, for example, in Fig. 10.

To draw the ends of the band together, the arm 52a has an opening 60a therein for receiving a fastener member 16a and the arm 53a has a thread-engaging portion therein similar to that illustrated in Figs. 1 to 6, inclusive. Such arrangement enables the ends of the band to be drawn toward each other after the respective lugs have been placed upon the ends of the strip and the wings thereon brought into telescopic position. To this end, the extension 26a has a finger 30a that enters the slot 11a, while the extension 25a has a finger 27a adapted to enter a slot 51a. As is the case with the form of Fig. 1, the lugs may be quickly assembled onto the strip without the need for welding or the use of other fastening members.

A hose clamp made in accordance with the present invention is advantageous in that all of the parts, except the bolt that is used for drawing the ends of the band together, may be made of stampings, yet the assembled structure may possess great rigidity so as to permit the band to be drawn sufficiently tight to withstand high internal pressure in the hose. Additionally, the lugs, being constructed as aforesaid, have a shoulder engagement with the clamping strip, whereby assembly is greatly facilitated, and have a telescopic inter-engagement which functions to resist any tendency to twist or distort during the tightening operation.

I claim:

1. A hose clamp comprising in combination, a strip formed in the shape of a band, a lug mounted on each end of the band, one of the lugs having a portion thereof adapted to receive the other lug, and to act as a guide therefor, each lug having an aperture therein, and one of said lugs carrying a thread-engaging portion, a fastening member having a shank extending through said apertures and adapted to coact with said thread-engaging portion to draw the lugs toward each other and thereby to clamp the strip around a hose.

2. A conduit clamp comprising a strip of sheet metal formed in the shape of a band, a lug mounted on each end of the band, said lugs and strip having coacting shoulders by means of which each lug may be detachably positioned on the strip, each lug having a laterally extending portion with an aperture therein, one of the lugs having a thread-engaging portion adjacent its aperture, a fastener having a shank adapted to engage the threaded portion for drawing the ends of the band together, and means on one lug for guiding the other telescopically during the tightening operation.

3. A conduit clamp comprising a strip of sheet metal formed in the shape of a band, said strip having transversely extending slots adjacent the ends thereof, a lug member mounted on each end of the strip, each member having a portion deformed therefrom and adapted to enter a slot in said strip, each of said deformed portions cooperating with the wall of the slot to resist movement of the lug toward the end of the strip and to be detachably positioned on the strip, each lug having a portion thereof extending away from the strip and having an aperture therein, a fastening member extending through the aperture and operating to draw the ends of the strip toward each other, one of said lugs having wing portions adapted to receive the other lug and to guide it during the tightening operation.

4. A conduit clamp comprising a strip of metal, a lug member detachably mounted on each end of the strip, each of said members having a portion thereof bearing against the strip and one of the lugs having a return bent portion, the other having an extension adapted to fit telescopically into the other lug, and each lug having portions extending away from the strip and having an aperture therein and a fastening member adapted to be received therein and operating to draw the ends of the strip toward each other.

5. A conduit clamp comprising a strip of sheet metal formed in the shape of a band, coacting lug members mounted on the respective ends of the strip, one of said members being bent intermediately to provide two arms, each of which has an aperture therein, and each of which has a lateral extension at the ends thereof, the other of said lug members being bent intermediately to provide two arms between which one of the extensions on the first-mentioned lug member is adapted to extend, the second-named lug member having a portion thereof extending away from the strip and having an aperture therein and having wing members adapted to receive a portion of the first-mentioned lug member, and a fastening member adapted to extend through said apertures and operable to draw the ends of the strip toward each other.

6. A conduit clamp comprising a strip of sheet metal formed into the shape of a band, a lug member detachably mounted on each end of the band, each member having a portion thereof bearing against the strip and having another portion extending away from the strip and having an aperture adapted to receive a fastening member, and each member having interfitting wing portions which operate as a guide for each other during the tightening operation, and a fastening member coacting with the two lug members to draw the ends of the strip toward each other.

7. A conduit clamp comprising a strip of sheet metal formed in the shape of a band, lug members detachably positioned upon the strip adjacent the ends thereof, each of said members having flanges engaging the sides of the strip and having a portion thereof formed to provide a shoulder for coaction with the strip, each member having a bolt engaging portion, one of the members having a channel-shaped wing portion, and the other having wing portions adapted to extend into the channel-shaped portion of the other lug member, and a fastening member coacting with the two lug members to draw the ends of the strip toward each other.

8. A conduit clamp comprising a strip of sheet metal formed in the shape of a band, said strip having openings extending transversely thereof and adjacent the end thereof, lug members having portions thereof bearing against the strip and having fingers occupying the openings and having other portions extending outwardly from the strip, the outwardly extending portions having apertures therein, and one of them being deformed about its aperture to provide a thread-engager, and a fastener screw extending through the apertures and coacting with the thread-engager to draw the ends of the band together.

9. A conduit clamp comprising a strip member of sheet metal formed in the shape of a band, lug members detachably engaging the strip member adjacent each end thereof, each end portion of the strip member and each lug member being provided with mutually interlocking openings and projections, said lug members being telescopically opposed to each other, and a fastening member operating to engage the lug members and thereby to draw the ends of the strip toward each other.

RICHARD A. HARTMAN.